United States Patent [19]

Weber

[11] 4,293,384

[45] Oct. 6, 1981

[54] NUCLEAR REACTOR PLANT FOR GENERATING PROCESS HEAT

[75] Inventor: Max Weber, Wiesendangen, Switzerland

[73] Assignee: Sulzer Brothers Limited, Winterthur, Switzerland

[21] Appl. No.: 46,637

[22] Filed: Jun. 8, 1979

[30] Foreign Application Priority Data

Jun. 13, 1978 [CH] Switzerland .................. 6420/78

[51] Int. Cl.³ ..................... G21C 3/56; F01K 9/00
[52] U.S. Cl. ............................. 376/391; 60/655
[58] Field of Search ............ 176/39, 60, 65; 60/644, 60/655, 650, 682

[56] References Cited

U.S. PATENT DOCUMENTS

| | | | |
|---|---|---|---|
| 3,043,763 | 7/1962 | Spillmann | 176/60 |
| 3,109,781 | 11/1963 | Natland | 176/60 |
| 3,444,038 | 5/1969 | Schabert | 176/60 |
| 3,697,372 | 10/1972 | Schabert | 176/60 |
| 4,022,659 | 5/1977 | Baumgaertner | 176/60 |

FOREIGN PATENT DOCUMENTS

| | | | |
|---|---|---|---|
| 873085 | 6/1971 | Canada | 176/60 |
| 2902141 | 7/1979 | Fed. Rep. of Germany | 176/60 |

OTHER PUBLICATIONS

Schulten et al., Anals. of Nuc. Energy, vol. 3, pp. 95–111, Pergamon Press, (1976).

*Primary Examiner*—S. A. Cangialosi
*Attorney, Agent, or Firm*—Kenyon & Kenyon

[57] ABSTRACT

The invention is directed to a nuclear reactor plant having a primary medium circuit including a nuclear reactor for generating a flow of heated primary working medium and a heat exchanger having a primary side to receive the flow of heated primary working medium. In accordance with the invention, a compressor is connected to the secondary side of the heat exchanger to receive a flow of secondary working medium therefrom which has been heated in heat exchange relation by the primary working medium for compression to a given temperature. By exchanging the heat at a lower temperature and subsequently pumping up the exchanged heat, a thermally highly stressed heat exchanger is replaced by a thermally highly stressed compressor.

21 Claims, 7 Drawing Figures

NUCLEAR REACTOR PLANT FOR GENERATING PROCESS HEAT

This invention relates to a nuclear reactor plant for generating process heat.

As is known, gas-cooled high temperature nuclear reactors usually produce heat at temperatures above 900° C. Consequently, studies have been undertaken to find ways of using this heat in conducting chemical processes. However, for reasons of safety, it is mandatory to separate the process medium from the reactor cooling gas by at least one heat exchanger.

At the present time, it is known to build heat exchangers to accomodate temperatures in the range of about 900° C. to 950° C. However, difficulties arise since the materials which have been suitable for such high temperatures usually have cobalt as an alloy ingredient. Cobalt, as is known, can be activated by neutron radiation in the nuclear reactor. Thus, under present safety considerations, it has been assumed that corrosion phenomena cannot be completely precluded at the surfaces in contact with the primary coolant.

It must therefore be expected that, if cobalt-containing material is used, minute amounts of cobalt-containing corrosion products would circulate in the primary loop with the cooling gas through the reactor. This, however, would have to lead to contamination of the cooling gas.

Accordingly, it is an object of the invention to extract nuclear heat from a primary loop of the reactor via heat exchangers which have no cobalt-containing materials on the primary side.

It is another object of the invention to extract heat from a primary working medium of a nuclear reactor plant in a relatively simple manner for use in a chemical process.

Briefly, the invention is directed to a nuclear reactor plant having a primary medium circuit including a nuclear reactor for generating a flow of heated primary working medium and a heat exchanger having a primary side to receive the flow of heated primary working medium. In accordance with the invention, a compressor is connected to a secondary side of the heat exchanger to receive a flow of secondary working medium therefrom which has been heated in heat exchange relation by the primary working medium for compression to a given temperature.

By exchanging the heat at a lower temperature and subsequently pumping up the exchanged heat, a thermally highly stressed heat exchanger is replaced by a thermally highly stressed compressor. The compressor can be built more easily, since the surfaces which come into contact with the hot working medium, e.g. a gas can be cooled. This is not feasible in a heat exchanger.

It is a further advantage of the plant that the temperature of the secondary working medium can be pushed above that of the primary working medium, i.e. the reactor cooling gas, depending on the pressure ratios applied.

In one embodiment, the nuclear reactor is constructed as a gas-cooled high-temperature reactor and the primary medium circuit also includes a turbine, e.g. a gas turbine, between the reactor and the heat exchanger for expanding the flow of heated primary working medium as well as a compressor between the heat exchanger and reactor for compressing the primary working medium prior to return to the reactor. In this construction, the gas turbine in the primary loop generates mechanical or electrical energy to drive the compressor for the secondary working medium, aided by the energy obtained from the expansion engine. Through suitable construction of the two fluid flow engines, i.e. the turbine and compressor, in the primary loop, a separate circulating blower for the reactor cooling gas can then be eliminated. The primary circuit or loop may also include a cooler between the heat exchanger and the compressor of the circuit for cooling the primary working medium.

By arranging a cooler in the primary loop the compressor can be made smaller. The cooler can furthermore take on the function of an emergency cooler.

The primary circuit may also have a recuperator with a primary side between the heat exchanger and cooler for receiving the primary working medium and with a secondary side between the compressor and reactor for receiving the primary working medium.

The recuperator provides an improvement of the thermal yield of the plant since less heat needs to be removed in the cooler, other conditions being the same.

The turbine may also be connected to the compressor of the primary circuit. This permits the use of commercially available gas turbine/compressor groups.

A direct drive whereby power released at the turbine is used for driving the compressor allows the speed of rotation of the two fluid flow engines to be chosen independently of the net-work frequency.

In order to use the extracted heat, a process heat exchanger is connected to the compressor to receive the flow of secondary working medium. This provides a second separation between the reactor cooling gas and the process medium, which may be desirable for safety reasons. However, it also provides advantages if the process utilizes at least one process medium in a liquid state.

In order to recover a substantial part of the energy spent for driving the compressor, the compressor, process heat exchanger and secondary side of the heat exchanger of the primary circuit are combined in a closed secondary circuit or loop together with a turbine between the process heat exchanger and secondary side of the heat exchanger in the primary circuit.

A secondary loop cooler may also be included in the secondary circuit to dispense with a cooler in the primary loop. This can lead to a simplification in the containment housing of the plant. The secondary loop cooler is located between the process heat exchanger and the turbine to remove heat from the flow of secondary working medium. The heat taken out via the secondary cooler can be utilized with high efficiency where the cooler is used as a heater of a tertiary steam power circuit.

In another embodiment, the process medium is used as the secondary medium so that considerable savings can be realized on the secondary side of the heat exchanger. In this case, a feed line is connected to the secondary side of the heat exchanger for delivering the process medium as the secondary working medium.

In order to recover the pressure energy contained in the process gas, a reaction chamber is connected to an outlet of the compressor to receive the flow of secondary working medium and a turbine is connected to the reaction chamber to receive the reacted working medium therefrom.

In still another embodiment, in order to optimize the energy balance of the fluid flow engines, i.e., to minimize the cooling losses, a power plant is placed in parallel with the primary side of the heat exchanger. This power plant may include a turbine, cooler and a compressor which form a cooling gas loop for conveying a portion of the primary working medium therethrough.

In order to provide smaller pressure ratios for the added turbine or added compressor, the compressor follows the turbine in the cooling gas loop relative to the flow of primary working medium.

In order to provide a better overall heat budget, the compressor may have at least one intermediate cooler. The cooling heat can then possibly be used at other points of the plant.

In the case where a reaction chamber is used, a number of process media can be delivered to the chamber as the secondary working medium. In this case, at least two feed lines are connected to the secondary side of the heat exchanger of the primary circuit for delivering separate flows of working media, at least one of which is gaseous. Also, means are provided for bringing the separate flows together at a point, at the latest, in the reaction chamber.

The compressor which is connected to the secondary side of the heat exchanger of the primary circuit may be constructed with a plurality of gas-carrying interior spaces to define a reaction chamber. In this case, a separate reaction chamber is not necessary. Further, if used, the separate reaction chamber can be made small. By using the spaces in the compressor, an intensive mixing of the process medium can occur. This, in turn, promotes the rate of reaction.

In order to increase the reaction rate in the reaction chamber, so that the reaction chamber can be kept small, use can be made of one or more catalysts in the chamber. The reaction rate may also be increased by using a static mixer in the reaction chamber to support at least one catalyst.

It is also possible to cool the fluid flow engines with a branch current of the medium conducted therein by laying down a cooling gas screen on the surfaces subjected to heat, e.g. the interior spaces and blades of the compressor.

These and other objects and advantages of the invention will become more apparent from the following detailed description and appended claims taken in conjunction with the accompanying drawings in which:

Figure 1:
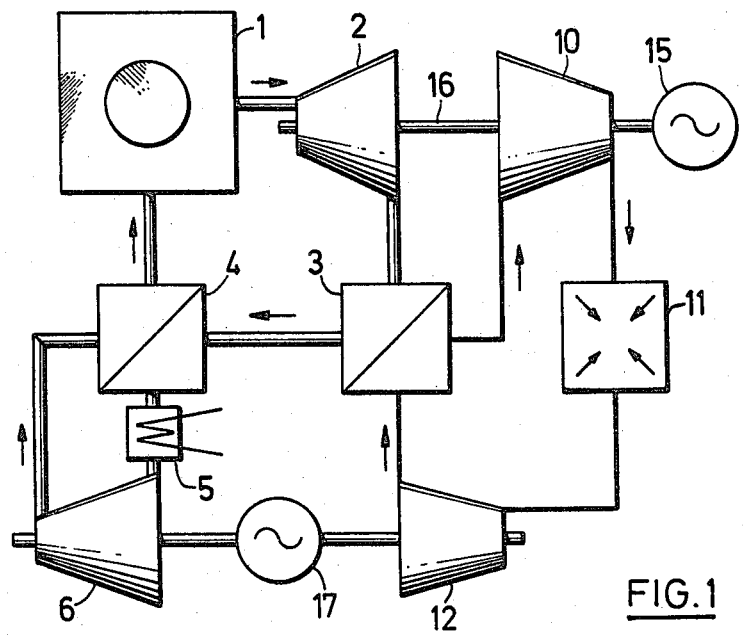
FIG. 1 illustrates a schematic view of a plant with a high-temperature reactor as the heat source constructed in accordance with the invention.

Referring to FIG. 1, the nuclear reactor plant is constructed with a primary medium circuit composed of a gas-cooled high-temperature nuclear reactor 1, a gas turbine 2, the primary side of a heat exchanger 3, the primary side of a recuperator 4, a cooler 5, a compressor 6 and the secondary side of the recuperator 4, in this order.

The heat exchanger 3 is connected on the secondary side to a compressor 10, a process heat exchanger 11 and an expansion engine, e.g. a turbine, 12, in this order, to form a secondary circuit or loop for a secondary working medium. The turbine 2 and the compressor 10 are mounted, together with an electric machine 15 which can operate as a motor or as a generator, on a common shaft 16. Similarly, the compressor 6 and the expansion engine 12 are mechanically connected to another electric machine 17.

In operation of the plant, a primary working medium, e.g. helium, at a temperature of 950° C. flows from the high temperature reactor 1 into the turbine 2 and is expanded in the turbine to a temperature of 750° C. while performing work. The helium then flows through the heat exchanger 3 and is cooled to 550° C. via a heat exchange with a flow of a secondary medium in the secondary side of the heat exchanger 3. The helium thereafter flows to and through the recuperator 4 and is further cooled to 150° C. via another heat exchange. The helium then flows through the cooler 5 and is cooled to about 20° C. After passing the cooler 5, the helium flows through the compressor 6 and is compressed. This leads to an output temperature of about 110° C. and the helium flows to the recuperator 4 where the temperature is increased to about 500° C. The helium then flows back to the reactor 1 and is heated once more to 950° C. while cooling the reactor 1.

In the secondary loop, the secondary working medium, e.g. a gas, enters the secondary side of the heat exchanger 3 with a temperature of 500° C. and exits with a temperature of 700° C. This working medium is then heated through compression in the compressor 10 to 900° C. With this temperature, the secondary medium enters the process heat exchanger 11 and gives off, in a manner not shown in detail, heat in the range of 900° C. to 600° C. to a process medium. Subsequently, the secondary medium is expanded in the expansion engine 12 to a temperature of 500° C. and returns into the heat exchanger 3.

Due to the circuit chosen, the entire primary circuit can be constructed from cobalt-free materials. The parts of the turbine 2 which carry the helium of higher temperature are cooled in a conventional manner, not detailed here, with helium of lower temperature or by a third medium.

In the secondary circuit, which is separated from the reactor 1 by the heat exchanger 3, it is permissible to use alloy components which could be activated by neutron irradiation. In addition, the compressor 10, like the compressor 6 can be cooled by the cooled secondary medium or by a third cooling medium.

Depending on the requirements of the operation, the fluid flow engines 2, 10, 6, 12 and the electric machines 15, 17 can be combined in a manner different from that shown. In principle, each fluid flow engine can also be coupled to a separate electric machine.

Figure 2:
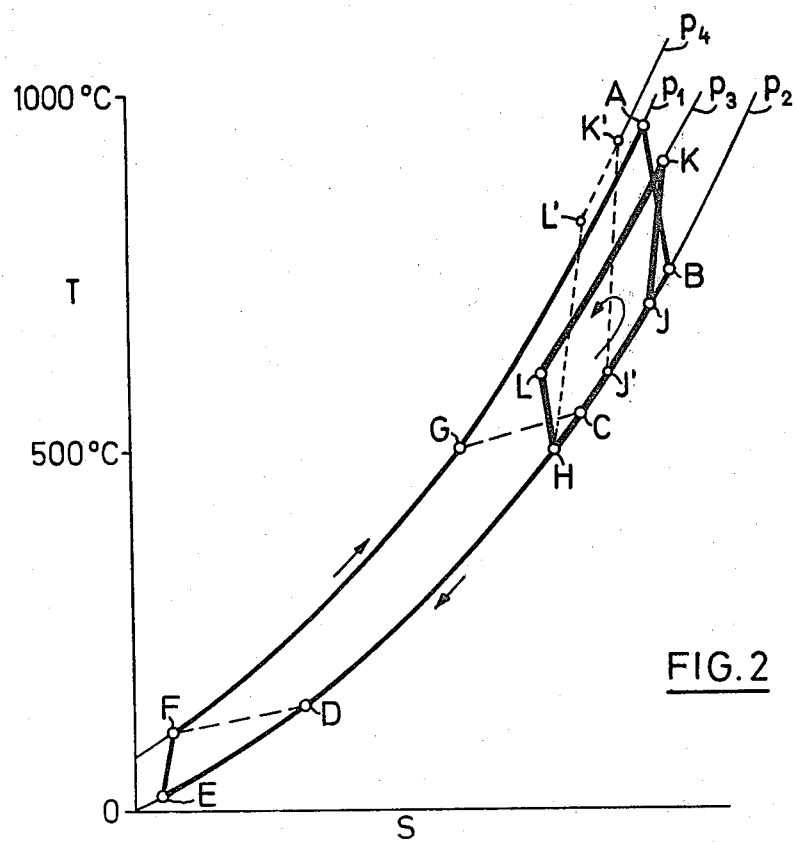
FIG. 2 illustrates a simplified temperature-entropy diagram for the gas stream circulating in the plant according to FIG. 1.

In the temperature (T)-enthalpy (S) diagram of FIG. 2, the solid closed line trace A-B-C-D-E-F-G-A represents the temperature and enthalpy cycle of the reactor cooling gas in the primary loop. A corresponds here to the state at the exit from the reactor 1. The section A-B is traversed in the turbine 2, while the pressure drops from level $p_1$ to level $p_2$. The section B-C corresponds to the cooling-down in the heat exchanger 3, the section C-D to the cooling-down in the recuperator 4, and section D-E to the cooling-down in the cooler 5. The section E-F corresponds to the compression in the compressor 6, the section F-G to the heat absorption on the secondary side of the recuperator 4 and, finally, the section G-A to the heat absorption in the nuclear reactor 1.

The bold line trace H-J-K-L-H corresponds to the temperature and enthalpy code in the secondary loop. H represents the state at the entrance on the secondary side of the heat exchanger 3. The section H-J corresponds to the heat absorption in the heat exchanger 3. The section J-K shows the compression in the compressor 10 which leads to the temperature (K) required for a chemical reaction. The section K-L corresponds to the heat loss in the process heat exchanger 11 and L-K, finally, represents the expansion in the expansion engine 12.

In the diagram as per FIG. 2 it was assumed that the same pressure $p_2$ prevails on the primary and secondary side. Although this leads to the simplest design of the heat exchanger 3, this condition is by no means necessary for realizing the invention.

The diagram according to FIG. 2 is drawn for the case that the same mass flow occurs in the primary and the secondary loop. This is likewise not necessary. To the contrary, it may be of advantage to choose the mass flow greatly different. Also, the pressure ratios $p_1:p_2$ and $p_3:p_2$ on the primary and secondary side, respectively, can be different from those shown. Thus, it may be advantageous to choose, as indicated by the dotted line trace H-J'-K'-L'-H, the pressure ratio ($p_4:p_2$) on the secondary side and the circulated amount of gas to be larger than on the primary side, in order to reduce the temperature span from K-L to K'-L' at the process heat exchanger 11.

Figure 3:
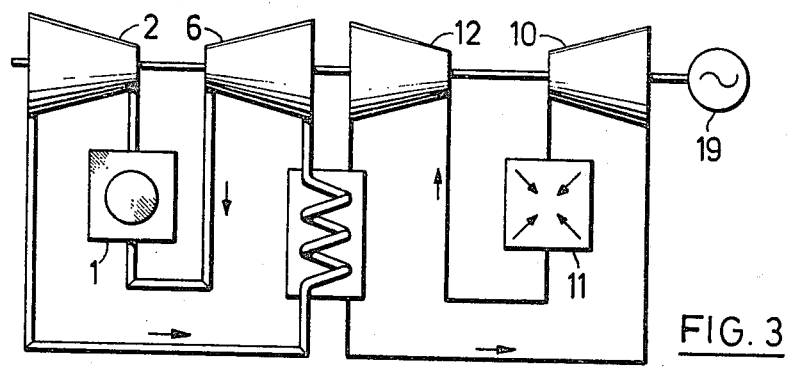
FIG. 3 illustrates a schematic view of a modified plant with a high-temperature reactor constructed in accordance with the invention.

Referring to FIG. 3, wherein like reference characters indicate like parts as above, the plant can be simplified over that according to FIG. 1, inasmuch as neither a recuperator nor a cooler is provided in the primary loop. Depending on the temperature span (K-L) occurring at the process heat exchanger 11, the energy budget of the four fluid flow engines 2, 6, 10, 12, which are here mounted on a common shaft, are balanced, positive or negative. It becomes negative if the temperature span K-L at the process heat exchanger 11 is small. In that case, energy must be supplied to the flow engines via the electric machine 19, for instance, from the supply network. The fluid flow engines can, of course, be connected to each other and to electric machines operating as motors and/or generators in any desired manner.

Figure 4:
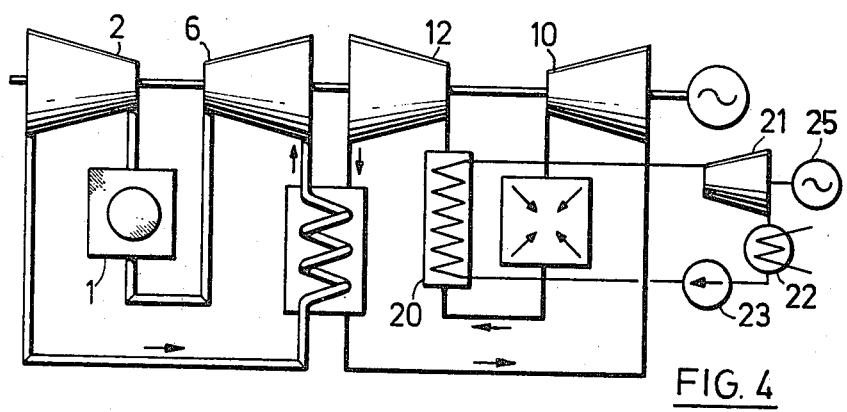
FIG. 4 illustrates a schematic view of a further modified plant according to the invention in which additional power is produced.

Referring to FIG. 4, wherein like reference characters indicate like parts as above, the energy balance of the fluid flow engines 2, 6, 10, 12 can be improved if the temperature span at the process heat exchanger 11 is small. To this end, the temperature span is increased between the exit from the compressor 10 and the entrance into the expansion engine 12. This is accomplished by positioning a secondary loop cooler 20 between the process heat exchanger 11 and the expansion engine 12 to remove heat from the flow of secondary working medium. This cooler 20 also forms a heater of a tertiary steam power circuit. As shown, this latter circuit contains a steam turbine 21, a condenser 22 and a feed pump 23. This circuit not only improves the balance of the fluid flow engines 2, 6, 10, 12 but also generates power via a generator 25 which is coupled to the steam turbine 21 and can furthermore be used for equalizing the balance of the flow engines 2, 6, 10 and 12.

The circuit according to FIG. 4 has the advantage over that according to FIG. 1 that the primary loop touching the reactor 1, which is therefore subject to more stringent requirements, is simpler.

Figure 5:
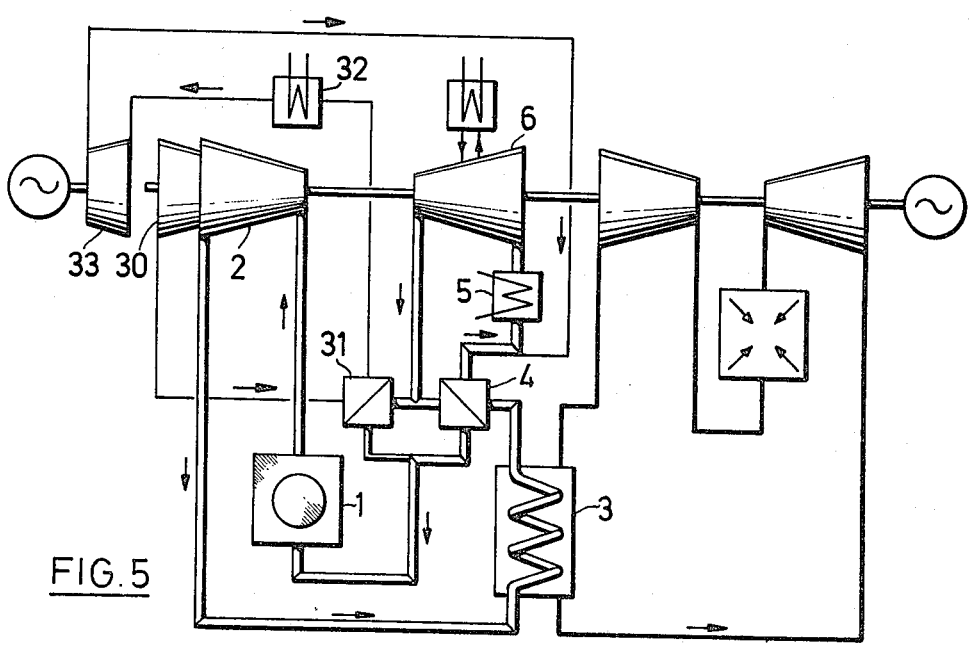
FIG. 5 illustrates a schematic view of an optimized plant with a branch stream on the primary side in accordance with the invention.

Referring to FIG. 5, wherein like reference characters indicate like parts as above, the plant may also be constructed such that a low-pressure stage 30 for a partial stream of the gas is provided at the turbine 2. In this case, a partial stream of primary working medium e.g. a gas is expanded to about that temperature which prevails at the primary-side exit of the heat exchanger 3. The outlet connection of the low-pressure stage 30 is connected via the primary side of a low pressure recuperator 31 and a cooler 32 to a precompressor 33 which pumps the gas to that pressure level which prevails at the entrance of the cooler 5. The outlet stub of the precompressor 33 is then connected to the inlet stub of the cooler 5.

The secondary side of the low-pressure recuperator 31 is connected in parallel to the secondary side of the recuperator 4 between the outlet stubs of the compressor 6 and the entrance of the reactor 1.

The circuit according to FIG. 5 ensures, with a small temperature span at the process heat exchanger, equalization of the energy balance of the fluid flow engines without the necessity for an additional steam process. However, part of the reactor cooling gas is conducted past the heat exchanger 3.

Figure 6:
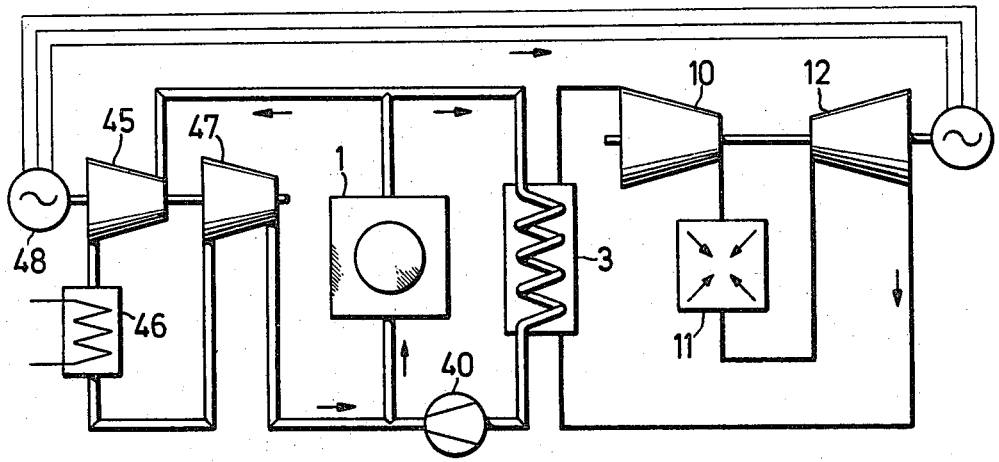
FIG. 6 illustrates a schematic view of a modified plant according to the invention, in which, starting out from relatively low temperatures in the primary loop, considerably higher process temperatures are obtained.

Referring to FIG. 6, wherein like reference characters indicate like parts as above, if the cooling gas temperature at the outlet of the reactor 1 is so low that the gas can be fed to the heat exchanger 3 without previous expansion, the primary circuit can be formed, in substance, by connecting together the reactor 1, the primary side of the heat exchanger 3 and a circulating blower 40.

Since mechanical energy is required for driving the circulating blower 40 and the fluid flow engines 10 and 12 in the secondary circuit, an additional power plant is connected in parallel with the primary side of the heat exchanger 3 and the circulating blower 40. As shown, the power plant includes a gas turbine 45, a cooler 46 and a compressor 47 which form a cooling gas loop for conveying a portion of the primary working medium therethrough. The compressor 47 which follows the turbine 45 is mounted together with the turbine 45 and a generator 48 on a common shaft. The gas turbine group 45 to 48 can be constructed so that its power covers the power requirements of the fluid flow engines 10, 12 on the secondary circuit side and of the circulation blower 40.

Depending on the temperatures appearing at the cooler 46, the heat exchanged there can be used further, for instance, in a steam process (not shown) or in heating network.

Figure 7:
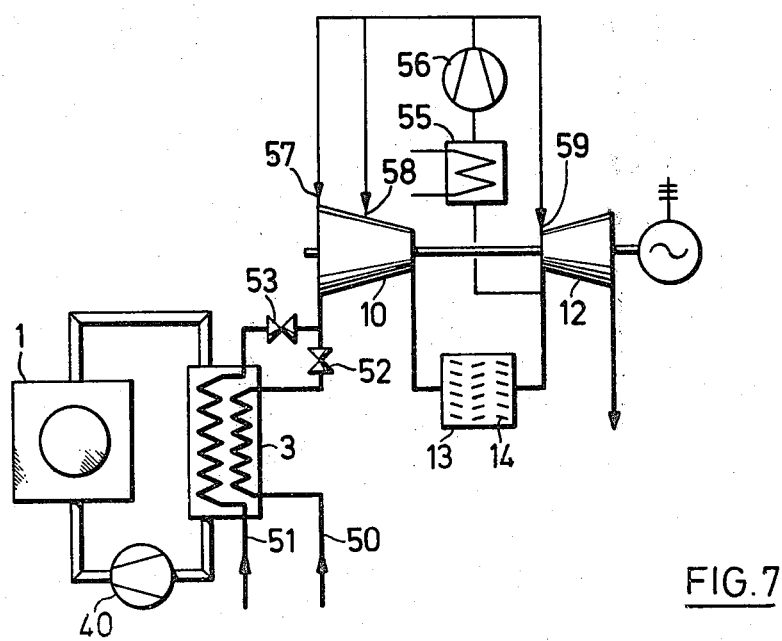
FIG. 7 illustrates a schematic view of a further modified plant according to the invention having a secondary loop with two parallel secondary flow paths in the heat exchanger.

Referring to FIG. 7, wherein like reference characters indicate like parts as above, the plant may be constructed so that the flow engines of the secondary system are operated by network power.

Contrary to the embodiment examples described so far, a pair of parallel feed lines 50, 51 are connected to the secondary side of the heat exchanger 3 for delivering a pair of separate flows of working media at least one of which is gaseous. Each feed line 50, 51 is equipped with a throttling valve 52, 53 at the outlet of the heat exchanger 3 and leads together to the compressor 10. A reaction chamber 13 is also located between the compressor 10 and the expansion engine 12 and is connected to an output of the compressor 10 for receiving the flows of secondary media. To this end, suitable means such as a common line is provided for bringing the separate media flows together at a point at the latest in the reaction chamber 13. The reaction chamber 13 is also equipped with static mixers 14 which consist of a ceramic structure to the surface of which catalysts are applied.

The static mixers 14 serve to mix the secondary media together as well as to support the catalysts. The catalysts, in turn, serve for the reaction of the secondary media.

As shown in FIG. 7, the compressor 10 and expansion engine 12, particularly the interior surfaces and blades thereof, can be cooled with compressed and re-cooled working medium. To this end, a cooler 55 is connected to an outlet of the reaction chamber 13 while an outlet of the cooler 55 is connected via an auxiliary blower 56 to cooling medium nozzles 57, 58 of the compressor 10 as well as to a cooling medium nozzle 59 of the expansion engine 12.

In the operation of the plant of FIG. 7, a reaction component is fed to each of the two feed lines 50, 51, at least one being gaseous. The mass flow of the two components is adjusted by the throttling valves 52, 53. After being mixed, the components flow into the compressor 10, where a chemical reaction is initiated in a plurality of gas-carrying interior spaces under the influence of the rising temperature and the intensive mixing. The reaction is then completed in the reaction chamber 13 under the influence of the catalysts. While the main portion of the reaction products flows off directly via the expansion engine 12, a branch stream passes to the cooling nozzles (57, 58, 59) of the compressor 10 and the expansion engine 12 via the cooler 55 and auxiliary blower 56, which may optionally be followed by a further cooler.

The process heat exchanger 11 can also form a heated reaction chamber; however, the reaction can also be initiated downstream from the process heat exchanger 11.

The mixing of the two components can, of course, also take place downstream of the compressor 10 or only inside the reaction chamber 13.

It is noted that various components and features which are grouped together in the embodiment examples can also be connected together in other combinations.

What is claimed is:
1. In combination,
a nuclear reactor plant having a primary medium circuit comprising a nuclear reactor for generating a flow of heated primary working medium and a heat exchanger having a primary side to receive the flow of heated working medium and a secondary side to receive a flow of a secondary working medium in heat exchange relation with the primary working medium; and
a compressor connected to said secondary side of said heat exchanger to receive a heated flow of the secondary working medium directly therefrom for heating under compression to a given temperature.

2. The combination as set forth in claim 1 wherein said reactor is a gas-cooled high-temperature reactor and said primary medium circuit further includes a turbine between said reactor and said heat exchanger for expanding the flow of heated primary working medium and a compressor between said heat exchanger and reactor for compressing the primary working medium prior to return to said reactor.

3. The combination as set forth in claim 2 wherein said circuit further includes a cooler between said heat exchanger and said compressor in said circuit for cooling the primary working medium therebetween.

4. The combination as set forth in claim 3 wherein said circuit further includes a recuperator having a primary side between said heat exchanger and said cooler for receiving the primary working medium and a secondary side between said compressor and said reactor for receiving the primary working medium.

5. The combination as set forth in claim 2 wherein said turbine is connected to said compressor to drive said compressor compressing the primary working medium.

6. The combination as set forth in claim 2 wherein power released at said turbine is used for driving said compressor for compression of the secondary working medium.

7. The combination as set forth in claim 1 further comprising a process heat exchanger connected to said compressor to receive the flow of compressed secondary working medium therefrom.

8. The combination as set forth in claim 7 further comprising a closed secondary circuit including said compressor, said process heat exchanger, said secondary side of said heat exchanger, and a turbine between said process heat exchanger and secondary side of said heat exchanger.

9. The combination as set forth in claim 8 wherein said secondary loop circuit includes a secondary loop cooler between said process heat exchanger and said turbine to remove heat from the flow of secondary working medium.

10. The combination as set forth in claim 9 wherein said cooler forms a heater of a tertiary steam power circuit.

11. The combination as set forth in claim 1 which further comprises a feed line connected to said secondary side of said heat exchanger for delivering the secondary working medium thereto as a process medium.

12. The combination as set forth in claim 11 which further comprises a reaction chamber connected to an outlet of said compressor to receive the flow of secondary working medium therefrom and a turbine connected to said reaction chamber to receive a flow of reacted working medium therefrom.

13. The combination as set forth in claim 1 which further comprises a power plant in parallel with said primary side of said heat exchanger, said power plant including a turbine, a cooler and a second compressor forming a cooling gas loop for conveying a portion of the primary working medium therethrough.

14. The combination as set forth in claim 13 wherein said second compressor follows said turbine in said cooling gas loop relative to the flow of primary working medium.

15. The combination as set forth in claim 1 or 2 wherein at least one of said compressors has at least one intermediate cooler.

16. The combination as set forth in claim 1 which further comprises at least two feed lines connected to said secondary side of said heat exchanger for delivering thereto a plurality of separate flows of working media at least one of which flows is gaseous, a reaction chamber for receiving the flows of secondary media and means for bringing the separate flows together at a point at the latest in said reaction chamber.

17. The combination as set forth in claim 16 wherein said compressor has a plurality of gas-carrying interior spaces defining said reaction chamber.

18. The combination as set forth in claim 16 wherein said reaction chamber is connected to an output of said compressor.

19. The combination as set forth in claim 18 which further comprises at least one catalyst in said reaction chamber for reacting of the secondary media together.

20. The combination as set forth in claim 18 which further comprises a static mixer in said reaction chamber for mixing the secondary media together and for supporting at least one catalyst thereon.

21. The combination as set forth in claim 1 or 2 which further comprises means for cooling the interior surfaces and blades of said compressor with compressed and re-cooled primary or secondary working medium.

* * * * *

UNITED STATES PATENT AND TRADEMARK OFFICE
CERTIFICATE OF CORRECTION

PATENT NO. : 4,293,384
DATED : October 6, 1981
INVENTOR(S) : Max Weber

It is certified that error appears in the above—identified patent and that said Letters Patent is hereby corrected as shown below:

Column 5, line 15, after "enthalpy" change "code" to
-- cycle --.

Column 10, line 13, after "said" change "compressor" to
-- compressors --.

Signed and Sealed this

Twenty-ninth Day of December 1981

[SEAL]

Attest:

GERALD J. MOSSINGHOFF

Attesting Officer

Commissioner of Patents and Trademarks